Patented May 4, 1954

2,677,673

UNITED STATES PATENT OFFICE 2,677,673

COPOLYMERS OF METHACRYLONITRILE DIMERS

Carl S. Marvel, Urbana, Ill., and Robert M. Joyce, Wilmington, Del., assignors to E. I. du Pont de Nemours & Company, Wilmington, Del., a corporation of Delaware No Drawing. Application March 29, 1951, Serial No. 218,285

7 Claims. (Cl. 260—41.5)

This invention relates to new polymeric materials and to a method for their preparation.

Polymers of many types are known, and some of them have been found useful in certain applications. The particular applications in which such polymers are useful are dependent on the particular properties which the polymers possess, which, in turn, are dependent on the particular composition, structure and molecular weight of the polymer. Furthermore, the particular properties possessed by some polymers which make them valuable for certain purposes makes the same polymer unsuitable for other purposes. For example, polychloroprene has, among other desirable properties, excellent low temperature toughness and good oil resistance when compared with natural rubber, but it is not as resistant to oil as desired in some applications. Improvement in oil resistance has been secured in the past by copolymerizing chloroprene with acrylonitrile but the resulting copolymers have been deficient in low temperature toughness. There is thus an obvious need for new polymers having unusual properties or combinations of properties desired in various specific applications.

An object of the invention is to provide copolymers from alpha-methylene-delta-substituted-adiponitriles with a conjugated diene. Another object is to provide a process for the preparation of vulcanized and unvulcanized copolymers of alpha-methylene-delta-substituted-adiponitriles with conjugated dienes. A further object is to provide vulcanized and unvulcanized copolymers which in addition to having the recurring olefinically unsaturated units derived from conjugated dienes, have recurring structural units of the general formula:

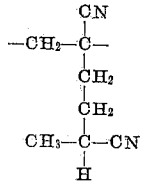

Other objects and advantages of the invention will hereinafter appear.

In accord with this invention new products are produced which have superior properties, particularly oil resistance. The polymers of this invention are copolymers of alpha-methylene-delta-methyladiponitrile and a conjugated diene containing 2 to 40 mole per cent of the nitrile component. These copolymers have utility per se and especially when heated under pressure with a vulcanizing agent.

The polymers are conveniently prepared by contacting alpha-methylene-delta-methyladiponitrile with a conjugated diene, e. g., butadiene or chloroprene, in the presence of an addition polymerization catalyst at a temperature between 0° C. and the temperature at which the reactants decompose. Temperatures of 25° to 60° C. are preferred for they give especially good results. The polymerization can be carried out at pressures ranging from atmospheric up to 10,000 atmospheres. The preferred pressures range from atmospheric up to the autogenous pressure developed by the polymerization system at the operating temperature. The polymerization can be carried out by bulk, solution, or emulsion methods, and either by batch, semi-continuous, or continuous operation. The semi-continuous and continuous methods are especially well suited for large-scale operations. The emulsion method of polymerization is preferred since copolymers made by this method possess especially good properties.

The copolymers of this invention contain, in addition to the recurring olefinically unsaturated units derived from the conjugated diene, recurring structural units of the general formula:

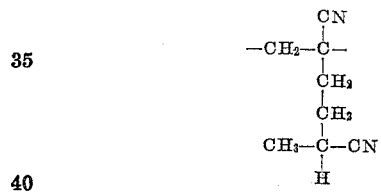

This novel structural unit of the polymer containing two functional groups, i. e., cyano groups, as extralinear substituents impart unusually desirable properties to the polymer. The properties imparted by this particular type of structural unit enhance the properties provided by the recurring structural unit provided by the particular conjugated diene monomer employed.

The alpha-methylene-delta-methyladiponitrile used as starting material in this invention can be prepared by heating methacrylonitrile in the liquid phase at a temperature of 160° to 400° C. in the presence of a polymerization inhibitor. An especially good method for preparing this nitrile is to heat methacrylonitrile in the absence of a polymerization initiator at a temperature of 300° to 400° C. under pressure sufficient to maintain a liquid phase for a period of time not exceeding 15 minutes, as described in U. S. application Ser. No. 158,325, filed April 26, 1950, by M. J. Hogsed, now U. S. Patent 2,566,203. Of course the alpha-methylene-delta-methyladiponitrile is freed of any polymerization inhibitor before being used in the process of this invention. The conjugated dienes used in this invention are the usual grades commercially available.

The invention is further illustrated by the following examples in which the proportions of ingredients are expressed in parts by weight unless otherwise noted.

*Example 1.*—A solution consisting of 75 parts of chloroprene (2-chloro-1,3-butadiene), 25 parts of alpha-methylene-delta-methyladiponitrile, 4.0 parts of Nancy wood rosin and 0.34 part of dodecyl mercaptan is emulsified at room temperature in a solution consisting of 157 parts of water, 0.95 part of sodium hydroxide, 0.60 part of a formaldehyde/sodium naphthalene sulfonate condensation product, and 0.60 part of potassium persulfate. The emulsion is stirred slowly and heated under a blanket of nitrogen to a temperature of 40° C. After 18 minutes at this temperature, polymerization starts as evidenced by a rise in the temperature of the emulsion. The polymerization is continued for 4.2 hours at 40–43° C. During this time the specific gravity of the polymer latex rises to 1.045. The polymerization is stopped at this point by the addition of 13 parts of an emulsion prepared by emulsifying a solution consisting of 0.4 part of phenothiazine, 0.4 part of p-tertiary-butylcatechol, and 70.4 parts of benzene in a solution containing 120 parts of water, 1.2 parts of the sodium salt of the sulfate of technical lauryl alcohol, and 0.6 part of the formaldehyde/sodium naphthalene sulfonate condensation product mentioned above. Twenty six and one-tenth parts of the polymer latex is poured into 158 parts of ethanol to coagulate the polymer. There is obtained 6.24 parts, corresponding to 66% conversion, of colorless elastic copolymer of alpha-methylene-delta-methyladiponitrile and chloroprene. Nitrogen analyses indicate that the copolymer contains 10.6 mole per cent alpha-methylene-delta-methyladiponitrile. The copolymer is soluble in benzene and chloroform.

*Example 2.*—A solution containing 360 parts of chloroprene, 40 parts of alpha-methylene-delta-methyladiponitrile, 16 parts of dehydrogenated purified wood rosin, and 0.7 part of dodecyl mercaptan is emulsified at room temperature in a solution containing 628 parts of water, 3.8 parts of sodium hydroxide, 2.4 parts of a formaldehyde/sodium naphthalene sulfonate condensation product, and 2.4 parts of potassium persulfate. The emulsion is stirred slowly and heated under a blanket of nitrogen to a temperature of 40° C. The polymerization starts immediately at this temperature as evidenced by a rise in the temperature of the emulsion. The polymerization is continued for 2 hours at 40° C. during which time the specific gravity of the emulsion rises from 0.980 to 1.067. The polymerization is stopped at this point by the addition of 44 parts of a stabilizer prepared by emulsifying a solution containing 0.4 part of phenothiazine, 0.4 part of p-tertiary-butylcatechol, and 70.4 parts of benzene in a solution containing 120 parts of water, 1.2 parts of the sodium salt of technical lauryl sulfate, and 0.6 part of the formaldehyde/sodium naphthalene sulfonate condensation product mentioned above. Coagulation of 21.3 parts of the polymer latex in 135 parts of ethanol gives 6.98 parts, corresponding to 90% conversion, of a colorless elastic polymer. Nitrogen analyses indicate that the product contains 4.0 mole per cent of alpha-methylene-delta-methyladiponitrile. This copolymer of alpha-methylene-delta-methyladiponitrile and chloroprene is insoluble in toluene and in methyl ethyl ketone.

The vulcanized copolymer has excellent oil resistance as indicated by the following tests. A sample of the copolymer is compounded on a rubber mill by the addition of the following ingredients in the order given.

| Ingredients | Parts by weight |
|---|---|
| Copolymer of Example 2 | 100.0 |
| Stearic acid | 0.5 |
| Phenyl-beta-naphthylamine | 2.0 |
| Extra light calcined magnesia | 10.0 |
| Semi-reinforcing furnace black | 29.0 |
| Zinc oxide | 10.0 |
| Di-o-tolylguanidine salt of dicatechol borate | 1.0 |

The resulting composition is then cured by heating at 153° C. for 40 minutes. Strips of this vulcanizate are suspended in kerosene for 3 days at 100° C. The volume of the strips of copolymer vulcanizate increases only 55% under these conditions; whereas the volume of a polychloroprene vulcanizate increases 96% in a similar test. These results show the excellent oil resistance of the copolymer of Example 2 since polychloroprene has hitherto been considered a very oil resistant polymer. This vulcanizate has a tensile strength (at break) of 2700 lb./sq. in., an elongation (at break) of 300%, a brittle point of −44° C. and a 10% retraction (T–10) temperature of −25° C.

For purposes of comparison, a polychloroprene vulcanizate has a tensile strength of 3400 lb./sq. in., elongation of 680%, brittle point of −44° C. and a T–10 retraction temperature of −34° C.; and a chloroprene/acrylonitrile copolymer (26.4 mole per cent acrylonitrile) vulcanizate has a tensile strength of 1975 lb./sq. in., elongation of 280%, brittle point of −8° C., and T–10 retraction at −6° C.

The brittle point temperatures given herein are the temperatures to which a strip of the polymer vulcanizate must be cooled to become brittle enough to shatter when struck a sharp blow. The retraction temperatures (T–10) are given as the temperature at which a stretched and frozen sample of polymer vulcanizate retracts to 10% of its initial frozen elongation (see Forman and Radcliff, Ind. & Eng. Chem. 38, 1048 (1946)). The tensile strength and elongation values are determined by standard methods in use for testing rubber compositions.

*Example 3.*—A copolymer is prepared from 200 parts of chloroprene and 200 parts of alpha-methylene-delta-methyladiponitrile by the procedure described in the preceding example. The copolymerization reaction is carried out for 7 hours at 40° C. During this time the specific gravity of the polymerization system rises from 0.970 to 1.036. Precipitation of 20.7 parts of the copolymer latex in 135 parts of ethanol gives 5.33 parts, corresponding to 68% conversion, of alpha-methylene-delta-methyladiponitrile/chloroprene copolymer. Nitrogen analyses indicate that the copolymer contains 24.0 mole per cent alpha-methylene-delta-methyladiponitrile. The copolymer is soluble in methyl ethyl ketone but is insoluble in toluene.

Vulcanizates prepared from the copolymer of Example 3, compounded as described in Example 2, show a volume increase of only 4% after immersion in kerosene for 3 days at 100° C. This vulcanizate has a tensile strength (at break) of 950 lb./sq. in., an elongation (at break) of 700%, a brittle point of —23° C., and a T–10 retraction at —9° C.

*Example 4.*—A solution containing 280 parts of chloroprene, 120 parts of alpha-methylene-delta-methyladiponitrile, 2.0 parts of very finely divided sulfur, and 0.3 part of dodecyl mercaptan is emulsified at room temperature in a solution containing 576 parts of water, 16 parts of a synthetic emulsifying agent prepared in general in accordance with Example I of U. S. Patent 2,163,133, 4.0 parts of the formaldehyde/sodium naphthalene sulfonate condensation product mentioned in Example 2, and 4.0 parts of glacial acetic acid. The emulsion is stirred slowly and heated under a blanket of nitrogen for 7.15 hours at 40° C., during which time the specific gravity of the emulsion rises from 0.980 to 1.050. The polymerization is stopped at this point by the addition of 40 parts of an emulsion prepared by emulsifying a slurry containing 30 parts of tetraethylthiuram disulfide and 30 parts of benzene in a solution containing 38 parts of water, 1.5 parts of the sodium salt of technical lauryl sulfate and 0.5 part of the formaldehyde/sodium naphthalene sulfonate condensation product mentioned above. Coagulation of 21 parts of the polymer latex with 135 parts of ethanol gives 6.57 parts, corresponding to 81.5% conversion, of alpha - methylene - delta - methyladiponitrile/chloroprene copolymer. Nitrogen analyses indicate that the polymer contains 12.8 mole per cent alpha - methylene - delta - methyladiponitrile. This polymer is insoluble in, but is swollen by toluene and methyl ethyl ketone.

Strips of vulcanizate prepared from the copolymer of Example 4, compounded as described in Example 2, show a volume increase of 25% after immersion in kerosene for 3 days at 100° C. This vulcanizate has a tensile strength (at break) of 2175 lb./sq. in., an elongation (at break) of 720%, a brittle point of —29° C., and a T–10 retraction at —7° C.

*Example 5.*—A solution containing 319 parts of carbon tetrachloride, 75 parts of chloroprene, 25 parts of alpha-methylene-delta-methyladiponitrile, and 0.5 part of alpha,alpha'-azobis (alpha,gamma-dimethylvaleronitrile) is heated for 13.6 hours at 77° C. The carbon tetrachloride is removed from the reaction mixture by distillation, leaving a residue of a light yellow viscous liquid amounting to 80 parts. This viscous liquid is dissolved in benzene and precipitated by pouring the resulting benzene solution into ethanol. The product is washed with ethanol and dried. Nitrogen analyses indicate that the product is an alpha-methylene-delta-methyladiponitrile/chloroprene copolymer containing 11.9 mole per cent of the nitrile component.

*Example 6.*—A solution containing 15 parts of chloroprene, 5.0 parts of alpha-methylene-delta-methyladiponitrile, 0.15 part of alpha,alpha'-azobis(alpha,gamma-dimethylvaleronitrile), and 0.1 part of dodecyl mercaptan is heated under a blanket of nitrogen for 24 hours at 44–46° C. The resulting viscous solution is dissolved in 40 parts of benzene and precipitated with 150 parts of ethanol. The resulting copolymer of alpha-methylene-delta-methyladiponitrile and chloroprene is a soft sticky solid amounting to 13 parts, which corresponds to a polymer yield (conversion) of 65%. Nitrogen analyses indicate that this copolymer contains 13.9 mole per cent of alpha-methylene-delta-methyladiponitrile.

*Example 7.*—A pressure reactor is charged with 65 parts of distilled water, 0.65 part of sodium hydroxide, 2.0 parts of oleic acid, 0.5 part of formaldehyde/sodium naphthalene sulfonate condensation product and 0.5 part of potassium persulfate. The contents of the reactor are frozen by immersing the reactor in a mixture of solid carbon dioxide and acetone and then 10 parts of distilled water and 0.075 part of potassium ferricyanide are added. After the mixture is again frozen, the following ingredients are added: 2.5 parts of alpha-methylene-delta-methyladiponitrile, 1.0 part of Nancy wood rosin, and 0.2 part of dodecyl mercaptan. The contents of the reactor are again frozen and then 47.5 parts of butadiene are added. The reactor is closed and agitated while being slowly warmed to 40° C. in a water bath. Agitation is continued for 16 hours at this temperature. The polymerization is stopped at this point by cooling the reaction mixture and adding 6.5 parts of a stabilizer prepared as described in Example 2. The reaction mixture is then poured into approximately 400 parts of denatured alcohol with vigorous agitation. The coagulated polymer is washed well with water and with alcohol and finally dried overnight in a vacuum desiccator over phosphorus pentoxide. To prepare a sample for analysis a portion of this polymer is dissolved in methyl ethyl ketone, filtered, coagulated in methanol and dried in a vacuum desiccator over phosphorus pentoxide. The total amount of copolymer of alpha-methylene-delta-methyladiponitrile and butadiene obtained is 8.8 parts, corresponding to a conversion of 17.6%. Nitrogen analyses indicate 8.0 mole per cent of alpha-methylene-delta-methyladiponitrile in the copolymer.

The copolymer of Example 7 is combined with another sample of copolymer prepared in the same way and the composite sample compounded in a rubber mill by adding the following ingredients in the proportions and order given:

| Ingredients | Parts by Weight |
| --- | --- |
| Alpha-methylene-delta-methyladiponitrile/butadiene copolymer of Example 7 | 25.0 |
| 2-Mercaptothiazole | 0.31 |
| Stearic acid | 0.75 |
| Channel black | 12.5 |
| Zinc oxide | 1.25 |
| Sulfur | 0.5 |

After standing overnight, the polymer composition is milled again for 15 minutes and then cured by heating at 142° C. for 45 minutes in a mold. The vulcanizate has a tensile strength (at break) of 1115 lb./sq. in., an elongation (at break) of 820% and a permanent set of 33.3%. Strips of the polymerizate immersed in kerosene for 2 days at 100° C. exhibit a volume increase of 341%. On immersion in xylene under the same conditions, the strips increase in volume 800%.

*Example 8.*—A copolymer is prepared from 12.5 parts of alpha-methylene-delta-methyladiponitrile and 37.5 parts of butadiene by the procedure described in Example 7. The yield of the product amounts to 27 parts, corresponding to a conversion of 54%. Nitrogen analyses indicate the copolymer contains 19.6 mole per cent of alpha-methylene-delta-methyladiponitrile. This copolymer is compounded and vulcanized by the procedure of Example 7 and the resulting strips of copolymer vulcanizate have a tensile strength (at break) of 2525 lb./sq. in., an elongation (at break) of 560%, and a permanent set of 10%. The per cent volume increase in strips of vulcanizate immersed for 2 days at 100° C. in kerosene and in xylene is 16% and 311%, respectively.

*Example 9.*—A copolymer is prepared from 25 parts of alpha-methylene-delta-methyladiponitrile and 25 parts of butadiene by the procedure described in Example 7. The resulting copolymer of alpha - methylene - delta - methyladiponitrile and butadiene amounts to 40.6 parts, or a conversion of 81.2%. Nitrogen analyses of the product indicate that it contains 33.2 mole per cent of alpha - methylene - delta - methyladiponitrile. Strips of the copolymer compounded and vulcanized as in Example 7 possess a tensile strength (at break) of 3450 lb./sq. in., an elongation (at break) of 300% and a permanent set of 6.7%. Strips of the vulcanizate immersed for 2 days at 100° C. in kerosene and in xylene exhibit a volume increase of 6% and 48%, respectively.

The examples have illustrated the polymers of this invention by specific reference to copolymers of alpha-methylene-delta-methyladiponitrile with choloroprene and with butadiene in various proportions. However, this invention includes copolymers of alpha-methylene-delta-methyladiponitrile with any conjugated diene in which the nitrile component comprises from 2 to 40 mole per cent of the copolymer. Other conjugated dienes which can be copolymerized with alpha - methylene - delta - methyladiponitrile include fluoroprene, alpha-cyanoprene, 2,3-dichloro-1,3-butadiene, 2,3-dimethyl-1,3-butadiene and isoprene.

In addition to the specific polymerization initiators mentioned in the examples, any conventional addition polymerization initiator can be used to prepare the copolymers of this invention. Specific examples of other operable initiators include organic peroxy compounds, e. g., diethyl peroxide, diacetyl peroxide, dibenzoyl peroxide, tertiary-butyl hydroperoxide, perphthalic acid, perbenzoic acid, and the like; inorganic peroxy compounds, e. g., ammonium persulfate; organic azo compounds in which the azo group is acyclic and is bonded from both of the nitrogens to carbons which are aliphatic in character and at least one of which carbon is tertiary, such as described in U. S. Patent 2,471,959 to M. Hunt, e. g., alpha, alpha'-azodiisobutyramide; alkali metals, e. g., sodium; and the like.

In some cases it is not necessary to add an initiator to the polymerization system to obtain the copolymers of this invention. This is illustrated in Example 4, where chloroprene and alpha-methylene-delta-methyladiponitrile in an aqueous emulsion containing emulsifying agents and glacial acetic acid polymerize spontaneously at 40° C. without the addition of an initiator.

Example 5 illustrates the use of one particular solvent in solution type polymerization. However, other inert liquids can be used for this purpose. Suitable solvents include hydrocarbons, e. g., benzene, toluene, xylene, cyclohexane, and decahydronaphthalene; ethers, e. g., diethyl ether and dioxane; and alcohols, e. g., ethyl, isopropyl, and tertiary-butyl alcohols.

The polymers of this invention can be compounded by employing any of the well known techniques for compounding natural and synthetic rubber with vulcanizing agents, e. g., sulfur and divalent metal oxides. Vulcanization promoters, accelerators and modifiers, fillers, lubricants and antioxidants can also be included in the compositions to obtain desired properties in the vulcanizates. The resulting compositions can be molded, sheeted, calendered, etc. in the usual manner.

The vulcanization can be carried out at room temperature or above, the exact temperature employed in any paritcular case being dependent on the type or form of vulcanizate desired and the particular vulcanizing agent employed. Temperatures of 100 to 170° C. are generally preferred. The time required for vulcanization likewise depends on the particular vulcanizing agents employed and on the temperature being used. In general, the curing time is inversely proportional to the temperature of vulcanization and can range from a few seconds, e. g., in a continuous vulcanization, at temperatures of 150° to 170° C. to several hours at room temperature.

The particular vulcanizing agents, modifiers and conditions employed with the copolymers of this invention are dependent on the (1) particular diene copolymerized with alpha-methylene-delta-methyladiponitrile and (2) the properties desired in the vulcanizate. For example, in the vulcanization of copolymers of alpha-methylene-delta-methyladiponitrile with butadiene, sulfur is the preferred vulcanizing agent while with chloroprene copolymers, a divalent metal oxide is the preferred vulcanizing agent. However, sulfur, sulfur chloride, divalent metal oxides, peroxides, certain nitro compounds and heat alone will produce vulcanization with either of these two types of copolymers. Various combinations of these vulcanizing agents can also be employed. For example, good results are obtained in the vulcanization of alpha-methylene-delta-methyladiponitrile/chloroprene copolymers compounded with zinc oxide, magnesium oxide, stearic acid, furnace black, phenyl-beta-naphthylamine, and the di-o-tolylguanidine salts of dicatechol borate. On the other hand, good results are obtained with butadiene copolymers compounded with sulfur, zinc oxide, stearic acid, channel black, and 2-mercaptothiazole. Other specific combinations of these various compounding agents can be used to obtain different properties in the vulcanizates.

The polymers of this invention possess a variety of properties which make them of particular value in certain applications. They are useful in the manufacture of films, fibers, coating compositions, and adhesives. The copolymers of alpha-methylene-delta-methyladiponitrile with chloroprene are especially useful because of their extremely high resistance to oil and their good toughness at low temperatures.

While the vlucanizates from the copolymers of alpha - methylene - delta - methyladiponitrile and conjugated dienes can be used in the fabrication of many products, the vulcanizates are outstanding in those products which require superior resistance to oils.

We claim:

1. A vulcanizate comprising a cured two-component copolymer derived from a conjugated diene copolymerized with an alpha-methylene-delta-methyladiponitrile, the nitrile component comprising 2 to 40 mole per cent of the copolymer.

2. The vulcanizate of claim 1 in which the diene is fluoroprene.

3. The vulcanizate of claim 1 in which the diene is alpha-cyanoprene.

4. The vulcanizate of claim 1 in which the diene is isoprene.

5. The vulcanizate of claim 1 in which the diene is butadiene.

6. The vulcanizate of claim 1 in which the diene is chloroprene.

7. A vulcanizate comprising a cured two-component copolymer of claim 1 containing a vulcanization agent of the group consisting of sulfur, divalent metal oxides and peroxides.

References Cited in the file of this patent

UNITED STATES PATENTS

| Number | Name | Date |
| --- | --- | --- |
| 2,564,102 | Fawcett et al. | Aug. 14, 1951 |